United States Patent
Moyer et al.

(10) Patent No.: US 10,744,954 B2
(45) Date of Patent: Aug. 18, 2020

(54) OVERHEAD DISPLAY SCREEN

(71) Applicant: Systems and Software Enterprises, LLC, Brea, CA (US)

(72) Inventors: Eric P. Moyer, Huntington Beach, CA (US); Samuel A. Carswell, Yorba Linda, CA (US); Brian Andrew Simone, Huntington Beach, CA (US)

(73) Assignee: Systems and Software Enterprises, LLC, Brea, CA (US)

(*) Notice: Subject to any disclaimer, the term of this patent is extended or adjusted under 35 U.S.C. 154(b) by 442 days.

(21) Appl. No.: 15/343,596

(22) Filed: Nov. 4, 2016

(65) Prior Publication Data

US 2017/0129417 A1 May 11, 2017

Related U.S. Application Data

(60) Provisional application No. 62/252,340, filed on Nov. 6, 2015.

(51) Int. Cl.
| | | |
|---|---|---|
| *B64D 11/00* | (2006.01) | |
| *B60R 11/02* | (2006.01) | |
| *B60R 11/00* | (2006.01) | |

(52) U.S. Cl.
CPC ........ *B60R 11/0235* (2013.01); *B64D 11/003* (2013.01); *B64D 11/0015* (2013.01); *B60R 2011/0028* (2013.01); *B60R 2011/0036* (2013.01); *B60R 2011/0075* (2013.01); *B60R 2011/0085* (2013.01)

(58) Field of Classification Search
USPC ................ 248/317, 343, 917, 918, 342, 344
See application file for complete search history.

(56) References Cited

U.S. PATENT DOCUMENTS

| | | | |
|---|---|---|---|
| D273,012 S * | 3/1984 | Kozloski | D16/203 |
| 5,096,271 A | 3/1992 | Portman | |
| 5,145,128 A | 9/1992 | Umeda | |
| 5,667,896 A * | 9/1997 | Carter | B32B 17/10036 248/205.3 |
| D394,570 S * | 5/1998 | Walters, III | D6/513 |
| 6,830,275 B2 * | 12/2004 | Shea | B60R 11/0217 296/1.07 |
| 2004/0251719 A1 | 12/2004 | Brauer | |

FOREIGN PATENT DOCUMENTS

| | | | |
|---|---|---|---|
| DE | 10 2004 008 791 B3 | 9/2005 | |
| EP | 3018560 A1 * | 5/2016 | H04N 5/2254 |
| JP | 57125086 | 1/1981 | |
| JP | 60143078 A | 7/1985 | |

OTHER PUBLICATIONS

Japan Patent Office, Office Action, dated Oct. 15, 2019.

* cited by examiner

*Primary Examiner* — Alfred J Wujciak
(74) *Attorney, Agent, or Firm* — Umberg Zipser LLP; Ryan Dean

(57) ABSTRACT

An entertainment display system for use within vehicles such as aircraft or buses. Systems of the inventive subject matter include a base component forming a basin with a fixed angle frame coupled with the basin. The system can then be installed into the bottom surface of an overhead storage compartment or the like. Methods of the inventive subject matter include steps required to install the system into a vehicle.

11 Claims, 1 Drawing Sheet

OVERHEAD DISPLAY SCREEN

This application claims the benefit of U.S. Provisional Application No. 62/252,340, filed Nov. 6, 2015. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is overhead display screens.

BACKGROUND OF THE INVENTION

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Existing aircraft overhead displays typically require elaborate mechanisms (e.g., motors and springs) to extend and retract hinged passenger displays, particularly when located in space restricted areas such as the overhead Passenger Service Channel (PSC) on narrow-body aircraft like the Airbus A320 and Boeing 737. These systems fail to take into account advances in display screens that obviate the need for such complicated mechanisms.

Thus, there is still a need for an improved overhead display screen.

SUMMARY OF INVENTION

The inventive subject matter provides apparatuses, systems, and methods of an overhead display screen that at least partially fits within a recess or basin disposed within an overhead compartment of the vehicle, and that is fixed in position relative to the overhead compartment.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In one contemplated embodiment, entertainment display systems are contemplated for a vehicle having an overhead compartment, such as that used to store passenger luggage or other items/material. The overhead compartment typically comprises an interior cavity where the luggage or other items can be stored, defined at least in part by a lower surface disposed below the compartment. The lower surface is generally disposed above a floor of the vehicle and below the top surface of the vehicle.

Preferred systems include a base frame comprising a basin having a basin depth, with the basin at least partially disposed within the overhead compartment. A fixed-angle frame is coupled to the base frame, such that the fixed-angle frame is disposed partially within the basin and extends downwardly away from and outside of the basin.

A display, preferably a flat panel such as a liquid crystal display (LCD) or an organic light emitting diode (OLED) display, is coupled with the fixed-angle frame, such that the display is advantageously disposed at least partially in the basin and therefore has a lower profile with respect to the vehicle. Because of the display technology and angle of the fixed-angle frame relative to the lower surface of the overhead compartment, the display can be recessed at least partially within the basin while allowing passengers on the vehicle to view content on the display.

In this manner, the mechanical features of prior art displays that rotate and move from a stored position to an in-use position can be eliminated, which maintenance requirements of the system.

SUMMARY OF THE INVENTION

In one aspect of the inventive subject matter, an entertainment display system for a vehicle having an overhead compartment for luggage or other material is contemplated. The overhead compartment includes a lower surface below the compartment and above a floor of the vehicle (e.g., an aircraft or a bus). The system includes a base frame having a basin with a basin depth (having a maximum depth of, e.g., 1.5, 2, or 3 inches), where the basin is at least partially disposed within the overhead compartment. The system additionally includes a fixed-angle frame coupled to the base frame. The fixed-angle frame is disposed partially within the basin and extends downwardly away from and outside of the basin. Finally, a flat panel display is coupled with the fixed angle frame.

The system is designed to reduce complexity in entertainment display systems that are installed into vehicles by obviating any need to mechanically rotate a display for storage. By eliminating those moving parts, additional space for electronics components required for the system is created. The end result is a lower profile, less complex system.

In some embodiments, the system additionally includes at least one fastener coupled to the basin, where the fastener is used to couple the system (e.g., the basin) to the overhead compartment of the vehicle. Additionally or alternatively, the basin can extend into the overhead compartment by at least the basin depth or by a distance equal to the basin depth.

In some embodiments, the fixed-angle frame is coupled with the base frame at an angle of between 20-30 and 25-30 degrees.

In another aspect of the inventive subject matter, an installation method for an entertainment display system for a vehicle having an overhead compartment for luggage or other material is contemplated. In this aspect, the overhead compartment has a lower surface below the compartment and above a floor of the vehicle. The steps of the method include: (1) inserting a basin into an aperture in the lower surface disposed below the compartment; (2) attaching the basin to the overhead compartment; and (3) affixing a fixed-angle frame to the basin.

In some embodiments, the fixed-angle frame can additionally include a display (e.g., a flat panel display). Some embodiments of the method additionally include the step of installing a display in the fixed-angle frame.

Additionally or alternatively, the step of inserting can also include coupling a base frame to the overhead compartment, where the base frame comprises the basin. Basins of the method can have a maximum depth of, for example, 1.5, 2, or 3 inches. Additionally or alternatively, the fixed-angle frame can be coupled with the basin at an angle of between 20-30 or 25-30 degrees.

DETAILED DESCRIPTION

The inventors contemplate a fixed position overhead display screen that could be used on commercial passenger aircraft to display safety videos, moving maps, advertisements, flight data, connecting gate information, and the like. Advancements in viewing angle, brightness, size, resolution, and pricing enable the implementation of a fixed position overhead display screen. Such a device was previously impossible, but now a screen, lighting, and electronics can be fit into the recessed area previously dedicated to the retraction mechanism. The innovation is a miniature fixed monitor that provides the same function but without the cost and reliability problems associated with traditional retractor mechanisms.

In preferred embodiments, the display unit has a number of unique features. It incorporates a flat screen display (e.g., an LCD display) and a fixed frame. The flat screen display is incorporated into the fixed frame, and the fixed frame is preferably mounted below the overhead storage containers on an aircraft. Previously, such a configuration was impossible without incorporating a hinged mechanism to allow the flat screen to swing downward for use. But with improvements in flat screen display technology, such a rotating mechanism is no longer necessary, making possible the incorporation of a fixed position flat screen display immediately below an overhead container.

Figure 1:
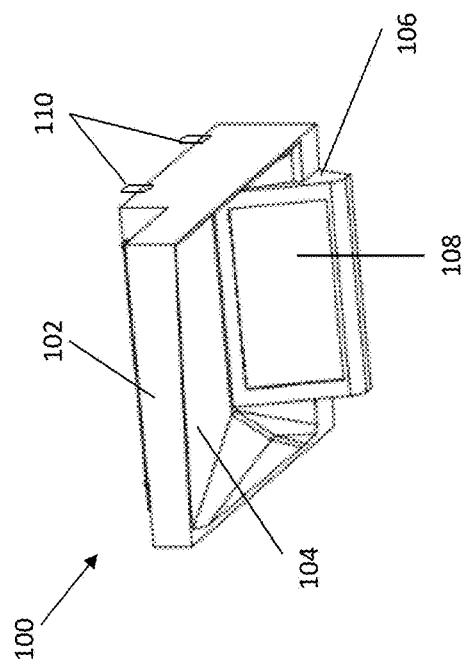
FIG. 1 shows a first embodiment of a fixed angle flat screen display unit.
Figure 2:
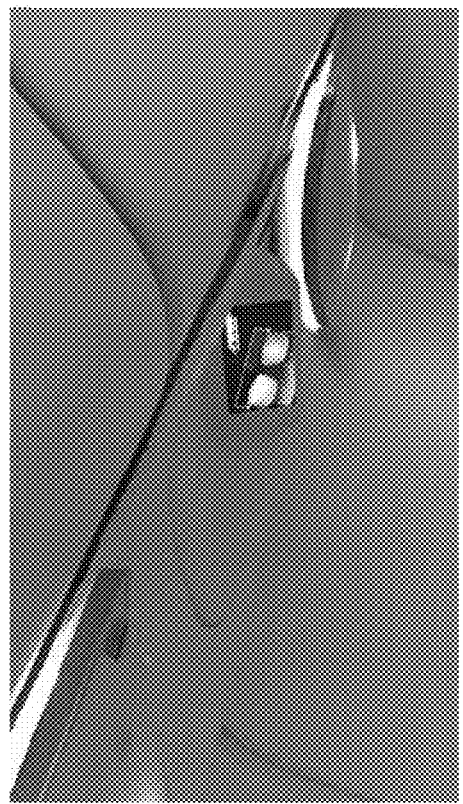
FIG. 2 shows a second embodiment of a fixed angle flat screen display unit.

FIGS. 1 and 2 show two different embodiments of the invention. FIG. 1 shows a version of the unit having a fixed-angle flat screen display. The unit is fully contained so that it can be easily replaced. FIG. 2 shows another embodiment having a fixed-angle flat screen display. This embodiment can also be easily replaced as it can be built into a fully contained unit having a flat screen attached to the fixed frame.

Embodiments of the inventive subject matter are built to have very low profiles. In prior systems, displays had to rotate downward not only so they could be seen but also so that they could be stored effectively. Such rotation for storage is unnecessary in embodiments of this invention because the flat screen display does not require nearly as much supporting electronics and circuitry. Moreover, there is no need for any of the mechanisms that would otherwise be required to cause rotation. The space that was previously occupied by rotation mechanisms can instead house electronics associated with the flat panel display.

The display system 100 in FIG. 1 includes a body frame 102 having a basin 104 and a fixed-angle frame 106 that is coupled with the body frame 102. The basin 104 can be formed from plastic, metal, a composite, or any other suitable material. In some embodiments, the basin 104 can be perforated but it can also be formed as a framework of interlocking components. In this context, interlocking can refer to the fastening of components using traditional fasteners including screws or glue. It can also refer to formation of the different interlocking components as a single piece.

The basin 104 can be formed to have various depths. In some embodiments, the depth can be constant throughout the basin 104. In other embodiments, the depth of the basin can vary (e.g., the depth of the basin can be sloped). Coupled to the body frame 102 within the basin 104 is a fixed-angle frame 106 that has a flat panel display 108 attached to it. The depth of the basin 104 can be at most 1.5 inches, 2 inches, 2.5 inches, 3 inches, 3.5 inches, 4 inches, or 4.5 inches. The depth of the basin 104 is designed such that at least a portion of a flat panel display 108 can be recessed into the basin 104 when it is coupled to the fixed-angle frame 106.

Additionally or alternatively, the display system 100 can include fasteners 110. The fasteners 110 are used to secure the display system to the interior of an aircraft cabin. Fasteners contemplated include clips, screws, bolts, tabs for screws to pass through, and so on.

By recessing a portion of the flat panel display 108 into the basin 104, rotating the display 108 upward for storage (as is common in prior art systems) becomes unnecessary as the flat panel display 108 will not protrude downward into the cabin of the aircraft as much as it would in the absence of a basin 104. To create an optimal viewing angle for passengers in the aircraft, the fixed-angle frame is coupled with the base frame at an angle of 20-30 degrees, 25-30 degrees, 30-40 degrees, 40-50 degrees, 50-60 degrees, 60-70 degrees, 70-80 degrees, and 80-90 degrees, where a 90 degree angle is defined as a right angle between the fixed-angle frame and the body frame. A 70 degree angle is preferred in some embodiments.

FIG. 2 additionally shows how an embodiment of the entertainment display system 200 appears when it is installed into an aircraft cabin 202. The system 200 is installed into a surface 204 (e.g., in an aperture in the lower surface) below the luggage compartment 206. In this way, the fixed angle frame 208 supports a flat panel display 210 at an angle and position that is easy for passengers to view.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range.

Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An entertainment display system for a vehicle having an overhead compartment for luggage or other material, wherein the overhead compartment comprises a lower surface disposed below the compartment and above a floor of the vehicle, the system comprising:
    a base frame comprising a basin having a basin depth, wherein the basin is at least partially disposed within the overhead compartment;
    a fixed-angle display frame fixedly mounted to the base frame and having first and second opposing sides, such that an angle of the display frame with respect to the base frame is fixed and the display frame is fixed in position relative to the base frame, wherein the first and second sides of the fixed-angle frame are disposed partially within the basin and above the lower surface of the overhead compartment, with the remainder of the first and second sides of the display frame extending away from and outside of the basin; and
    a flat panel display supported by the fixed angle frame.

2. The system of claim 1, wherein a maximum basin depth is 1.5 inches.

3. The system of claim 1, wherein a maximum basin depth is 2.0 inches.

4. The system of claim 1, wherein a maximum basin depth is 3.0 inches.

5. The system of claim 1, wherein an angle between the fixed-angle frame and the base frame is between 20-30 degrees.

6. The system of claim 1, wherein an angle between the fixed-angle frame and the base frame is between 25-30 degrees.

7. The system of claim 1, further comprising at least one fastener coupled to the basin, wherein the fastener couples to the overhead compartment of the vehicle.

8. The system of claim 1, wherein the basin extends into the overhead compartment by at least the basin depth.

9. The system of claim 1, wherein the basin extends into the overhead compartment at a distance equal to the basin depth.

10. The system of claim 1, wherein the flat panel display is fixed in place relative to the base frame, and that a portion of the flat panel display is disposed within the basin, and the remaining portion of the flat panel display extends downwardly away from and outside of the basin.

11. An entertainment display system for a vehicle having an overhead compartment for luggage or other material, wherein the overhead compartment comprises a lower surface disposed below the compartment and above a floor of the vehicle, the system comprising:
    a base frame comprising a basin having a basin depth, wherein the basin is at least partially disposed within the overhead compartment;
    a fixed-angle display frame fixedly mounted to the base frame and having first and second opposing sides, such that an angle of the display frame with respect to the base frame is fixed and the display frame is fixed in position relative to the base frame, wherein the first and second sides of the fixed-angle frame are disposed partially within the basin with the remainder of the first and second sides of the display frame extending away from and outside of the basin;
    a flat panel display supported by the fixed angle frame; and
    wherein the first side has a first length defined as a distance the first side extends away from the basin, and the second side has a second length defined as a distance the second side extends away from the basin, and wherein the first length is greater than the second length.

* * * * *